Patented Jan. 9, 1923.

1,441,541

UNITED STATES PATENT OFFICE.

WALTER JAMES STEVENSON, OF CHARING CROSS, LONDON, ENGLAND.

ACETYL CELLULOSE.

No Drawing. Application filed August 12, 1919. Serial No. 317,081.

(GRANTED UNDER THE PROVISIONS OF THE ACT OF MARCH 3, 1921, 41 STAT. L., 1313.)

*To all whom it may concern:*

Be it known that I, WALTER JAMES STEVENSON, a subject of the King of Great Britain, residing at Charing Cross Hotel, Charing Cross, in the county of London, England, have invented certain new and useful Improvements in Acetyl Cellulose (for which I have made application in Great Britain Nov. 30, 1917, Patent No. 130,029), of which the following is a specification.

This invention relates to the manufacture of acetyl cellulose.

Hitherto the basic material employed for the manufacture of acetyl cellulose has been bleached cotton wool.

According to the present invention bleached sulphite paper pulp is employed as the basic material instead of bleached cotton wool. This gives me greater stability, more homogeneous control, greater or larger life, and better ability to take all dyes or colors than acetyl cellulose from cotton, cotton waste, or wood pulp, used as a basic material for making acetyl cellulose. Bleached sulphite paper pulp is a much cheaper material than bleached cotton wool. As catalyzers zinc chloride, or nitric acid, or dimethyl sulphate may be employed.

As an example of the method of carrying the invention into effect the materials may be taken in the following proportions.

| | | |
|---|---|---|
| Bleached sulphite paper pulp | 1 | kilogramme |
| Glacial acetic acid | 4.0 | kilogramme |
| Acetic anhydride | 2.8 | kilogramme |
| Zinc chloride | 200 | grammes |

These materials are thoroughly mixed and allowed to stand for seven to eight hours at a temperature of 60 to 70 degrees centigrade, drowning the solution in water. I thus obtain the precipitate which is thoroughly washed and dried at a temperature of 100 to 120 degrees centigrade. The precipitate is easily dissolved in pure dry acetone to form a transparent solution. By the use of concentration and recovery plant from seventy-five to eighty per cent of the waste acid may be recovered.

As alternative catalysts to the zinc chloride, nitric acid or dimethyl sulphate may be employed in the same proportion.

What I claim and desire to secure by Letters Patent of the United States is:—

1. A method of manufacturing acetyl cellulose which consists in acetylating bleached sulphite paper pulp in the presence of a catalyst.

2. The manufacture of acetyl cellulose by mixing bleached sulphite paper pulp, glacial acetic acid, acetic anhydride and zinc chloride.

3. The manufacture of acetyl cellulose by mixing the following materials substantially in the following proportions:—

| | | |
|---|---|---|
| Bleached sulphite paper pulp | 1 | kilogramme |
| Glacial acetic acid | 4.0 | kilogramme |
| Acetic anhydride | 2.8 | kilogramme |
| Zinc chloride | 200 | grammes |

4. Acetyl cellulose produced by acetylating bleached sulphite paper pulp.

WALTER JAMES STEVENSON.